(12) United States Patent
Anderson

(10) Patent No.: US 7,562,832 B1
(45) Date of Patent: Jul. 21, 2009

(54) TWO-CONDUCTOR MOISTURE ACTIVATED SWITCH

(75) Inventor: Scott K. Anderson, Meridian, ID (US)

(73) Assignee: Technical Development Consultants, Inc., Meridian, ID (US)

( * ) Notice: Subject to any disclaimer, the term of this patent is extended or adjusted under 35 U.S.C. 154(b) by 0 days.

(21) Appl. No.: 12/015,988

(22) Filed: Jan. 17, 2008

(51) Int. Cl.
*A01G 27/00* (2006.01)
*A01G 25/00* (2006.01)
*A01G 25/16* (2006.01)
*B05B 12/08* (2006.01)
*G01N 5/02* (2006.01)
*G01R 27/26* (2006.01)

(52) U.S. Cl. .................. 239/64; 239/63; 137/78.3; 73/73; 324/664; 324/689

(58) Field of Classification Search .......... 239/63, 239/64, 70; 137/78.3, 79, 80, 78.2; 73/73, 73/74; 324/664, 689; 700/284
See application file for complete search history.

(56) References Cited

U.S. PATENT DOCUMENTS

| | | | | |
|---|---|---|---|---|
| 3,847,351 A | * | 11/1974 | Hasenbeck | 239/63 |
| 4,684,920 A | * | 8/1987 | Reiter | 340/310.11 |
| 4,693,419 A | * | 9/1987 | Weintraub et al. | 239/63 |
| 4,718,446 A | * | 1/1988 | Simpson | 137/78.3 |
| 4,796,654 A | * | 1/1989 | Simpson | 137/78.3 |
| 4,838,296 A | * | 6/1989 | Brooks | 137/78.3 |
| 4,850,386 A | * | 7/1989 | Bireley | 137/78.3 |
| 4,852,802 A | * | 8/1989 | Iggulden et al. | 239/64 |
| 4,922,433 A | | 5/1990 | Mark | |
| 4,936,333 A | * | 6/1990 | Bireley | 137/78.3 |
| 4,941,501 A | * | 7/1990 | Bireley | 137/78.3 |
| 4,952,868 A | * | 8/1990 | Scherer, III | 324/664 |
| 5,060,859 A | * | 10/1991 | Bancroft | 239/64 |
| 5,148,826 A | * | 9/1992 | Bakhshaei | 137/80 |
| 5,337,957 A | | 8/1994 | Olson | |
| 5,424,649 A | * | 6/1995 | Gluck et al. | 327/667 |
| 5,430,384 A | * | 7/1995 | Hocker | 324/694 |
| 5,445,176 A | * | 8/1995 | Goff | 137/80 |
| 5,749,521 A | * | 5/1998 | Lattery | 239/64 |
| 5,839,658 A | * | 11/1998 | Sarver | 239/1 |
| 5,908,045 A | * | 6/1999 | Wallace et al. | 137/78.3 |
| 6,016,971 A | * | 1/2000 | Welch et al. | 239/63 |
| 6,123,093 A | * | 9/2000 | D'Antonio et al. | 137/78.3 |

(Continued)

OTHER PUBLICATIONS

RS500 Data Sheet, [online]. Acclima, Inc. [retreived on Nov. 14, 2007]. Retrieved from the Internet: <URL: http://acclima.com/images/cut/RS500.pdf>.

*Primary Examiner*—Darren W Gorman
(74) *Attorney, Agent, or Firm*—Your Intellectual Property Matters, LLC; Robert A. Frohwerk (57) ABSTRACT

An absolute moisture sensor is coupled to a controller circuit with the combination being integrated into a single device as a moisture-activated switch. The resultant switch is coupled in series with a power control line of a moisture-controlling device and can be placed within the medium for which moisture is to be controlled. In one typical use, the switch is buried in soil for control of valves that supply irrigation water. Since the moisture sensor is selected to provide an absolute reading of moisture, the switch programs itself when power from an external source is first applied. A communication protocol provides for readout of sensor values and allows for a remote reset of the controller.

7 Claims, 4 Drawing Sheets

U.S. PATENT DOCUMENTS

| | | | |
|---|---|---|---|
| 6,378,779 B1 * | 4/2002 | Taylor | 239/63 |
| 6,401,742 B1 * | 6/2002 | Cramer et al. | 137/78.3 |
| 6,657,443 B2 * | 12/2003 | Anderson | 324/664 |
| 6,685,104 B1 * | 2/2004 | Float et al. | 239/63 |
| 6,756,793 B2 * | 6/2004 | Hirono et al. | 324/690 |
| 6,831,468 B2 * | 12/2004 | Anderson et al. | 324/664 |
| 6,938,834 B2 * | 9/2005 | Harris | 239/63 |
| 6,975,245 B1 * | 12/2005 | Slater et al. | 340/870.16 |
| 6,978,794 B2 * | 12/2005 | Dukes et al. | 137/1 |
| 7,010,394 B1 * | 3/2006 | Runge et al. | 700/284 |
| 7,126,352 B2 * | 10/2006 | Bernhard | 324/664 |
| 7,474,105 B2 * | 1/2009 | McDermid | 324/689 |
| 2003/0015024 A1 * | 1/2003 | Campbell et al. | 73/73 |
| 2003/0160107 A1 * | 8/2003 | Harris | 239/63 |
| 2004/0164750 A1 * | 8/2004 | Anderson | 324/664 |
| 2005/0212532 A1 * | 9/2005 | Bernhard | 324/664 |
| 2006/0144437 A1 * | 7/2006 | Dresselhaus et al. | 137/78.3 |
| 2006/0144438 A1 | 7/2006 | Dresselhaus et al. | |
| 2007/0145984 A1 * | 6/2007 | McDermid | 324/689 |
| 2007/0267515 A1 * | 11/2007 | Sargent | 239/63 |

* cited by examiner

FIG. 4

TWO-CONDUCTOR MOISTURE ACTIVATED SWITCH

CROSS-REFERENCES TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates generally to devices which control irrigation of the ground in response to soil moisture. In particular, the described invention relates to a two-conductor self-contained moisture-activated switch to be used to control sprinkler irrigation in conjunction with conventional timer-activated irrigation systems.

BACKGROUND OF THE INVENTION

The measurement of soil moisture at various depths in the soil is an increasingly important activity in modern agriculture. Crop yields are improved, water and fertilizer are conserved, and diseases are prevented when irrigation water is applied in a manner that avoids stress to a crop. One cause of crop stress is allowing the soil to become too dry. Other stress factors are root asphyxiation and excessive leeching of nutrients due to over-watering. Soil moisture measurements taken at appropriate soil depths, especially when taken within the root zone of the irrigated crop, provide necessary feedback to facilitate precise scheduling of irrigation.

A variety of sensors have been developed to detect moisture in soil. These include conductivity sensors and sensors of bulk dielectric constant. Methods used for measuring the dielectric constant include time domain reflectometry or transmissometry, frequency domain reflectometry (FDR), capacitance probe (CP), and ground-penetrating radar (GPR). These methods exploit the high dielectric constant of water relative to that of the medium being measured in order to extrapolate the moisture content of the medium.

Soil permittivity measurements have become the standard means of deriving soil moisture content. Time Domain Transmissometer (TDT) devices have been developed for use in soil moisture studies. Recent advances using low cost digital signal processing in conjunction with these devices has yielded high accuracy and stability even in the presence of temperature variations and moderate concentrations of salts and other ionic material in the soil. A TDT type of sensor such as that disclosed in U.S. Pat. No. 6,831,468 to Anderson, et al. ('468) is well suited for permanent installation where continuous moisture monitoring is needed for closed-loop irrigation control.

Typical sensing devices must be calibrated for the soil, and the readings must be interpreted by someone trained in the use of the specific sensing device. However, a sensor such as the TDT of the '468 reports absolute soil moisture at any desired soil depth so that it does not need to be calibrated for the soil. Its readings are stable with changing soil temperatures, electrical conductivity and compaction. The resulting data may be easily and reliably used by the crop grower without need of a consultant to interpret the readings. The data is of sufficient accuracy and stability to enable automatic, closed-loop irrigation scheduling.

BRIEF SUMMARY OF THE INVENTION

The disclosed invention is a moisture-activated switch that is intended to be used to control sprinkler irrigation zones in conventional timer-activated irrigation systems. It is designed to control the application of water to a single irrigation zone, although it may also be used to control water application to several zones which have similar microclimates. It is easily retrofitted into an existing previously installed system since it operates with a conventional timer or controller as is commonly used with a sprinkler system. An important feature of the described apparatus is that it acts as both a moisture sensing device and a hard switch closure, and accomplishes both of these functions through a single two-conductor connection. An additional important feature is that the apparatus does not require a user interface since it need not be programmed by the user. All moisture measurement, control and setup functions are integrated and encased within the same buriable enclosure. This unit measures the soil properties and automatically sets the irrigation parameters as appropriate to the local micro-environment.

The invented apparatus is installed in series with the zone wiring of the one or more zones to be controlled. The existing timer or controller is then set to water the controlled zones on a frequent schedule. When the irrigation timer or controller applies power to the zone the apparatus will wake up and measure the current absolute soil moisture level in its vicinity. If the measured moisture is greater than the automatically-set threshold level then the apparatus will not allow power to be passed through to the solenoid valve and no irrigation will occur. However, if the moisture reading is below the threshold setting the apparatus will close its internal switch and allow power to pass through to actuate the solenoid valve, thus allowing the full watering cycle to occur. The capability to measure absolute moisture, rather than only relative moisture, enables the activation threshold level to be set automatically within the apparatus at the time of installation. Provision is made to allow the apparatus to be reset so that it will adjust to a new environment in situations where it is relocated.

BRIEF DESCRIPTION OF THE DRAWINGS

The particular features and advantages of the invention briefly described above as well as other objects will become apparent from the following description taken in conjunction with the accompanying drawings, in which.

The following Reference Numbers may be used in conjunction with one or more of the accompanying FIGS. 1-4 of the drawings:

| | |
|---|---|
| 100 | Moisture-Activated Switch |
| 105 | Zone common interconnection |
| 110 | bridge rectifier |
| 120 | MOSFET |
| 130 | switching regulator |
| 140 | "Valve On" input |

-continued

| | |
|---|---|
| 150 | Low Dropout Regulator (LDO) |
| 200 | Irrigation Controller (Timer) |
| 205 | Controller common interconnection |
| 210 | Zone 1 Control |
| 220 | Zone 2 Control |
| 300 | Solenoid Valve |
| 310 | Zone 1 Solenoid Valve |
| 320 | Zone 2 Solenoid Valve |
| 400 | microprocessor |
| 420 | real-time clock |
| 500 | power supply |
| 600 | communications module |
| 610 | display submodule |
| 620 | keypad submodule |

DETAILED DESCRIPTION OF THE INVENTION

The presently invented device is a moisture-activated switch that is based upon a digital Time Domain Transmissometer (TDT) absolute soil moisture sensor such as that described by Anderson, et al. in U.S. Pat. No. 6,831,468. Here, the TDT is integrated with a switch and control logic to operate the switch through an external interface that requires only two-conductors. Since the device is intended to be buried in the soil, it will not easily be accessible following its installation, and therefore, no control panel or readout is necessary. The device is designed to automatically program itself, after it is installed, using a relatively simple programming sequence that is initiated in response to the first application of power from an external timer. This auto-programmable feature is made possible by incorporation of an absolute moisture sensor rather than a more common sensor of relative moisture.

An installer buries the unit within the root zone of the area to be irrigated. The installation location is then flooded with water so that a volume of soil surrounding the buried sensor becomes saturated. The irrigation clock is then set to enable the application of water early the next day. By that time, the gravitational water will have drained from the soil around the Moisture-Activated Switch and the moisture level will be at Field Capacity. When the irrigation zone is turned on this first time, the switch unit of the presently described device will measure the moisture content and store the measured value into non-volatile memory, identifying it as the Field Capacity of that soil region. The unit will then calculate a Refill Threshold amounting to some given percentage of Field Capacity and save that value to memory. From that time onward, whenever power is applied to that zone, the saved Refill Threshold will be used to determine whether or not a valve should be actuated to apply water to the associated zone. The relationship of Refill Threshold to Field Capacity depends upon the particular embodiment of the invention as will be discussed later.

If the moisture sensor portion of the device determines that watering is required, the controller portion of the device engages an internal switch closure to short together the unit's two external connection lines causing the solenoid valve to be actuated so that water is applied to the zone. If water is not needed the switch remains open. The miniscule power drawn by the Moisture-Activated Switch is not sufficient to cause the solenoid valve to be actuated unintentionally.

Once the switch decision has been made the unit remains in that decided state for some time, say 30 minutes, after the clock removes power from the zone. This feature permits multiple solenoid valves to be controlled by a common Moisture-Activated Switch. This also permits an individual zone to operate in a "cycle and soak" fashion on the condition that the power interruptions, due to zones being switched off, do not last for more than 30 minutes. When the Moisture-Activated Switch detects that the power to the circuit has been absent for more than 30 minutes, it assumes that the irrigation time for that program has been fulfilled. It will then treat the next power application as a start of a new program, will read the soil moisture level, will compare it to the Refill Threshold and will make and execute a new watering decision.

Thus, in one embodiment, the user can program the timer for multiple start times, spacing them about an hour apart. The run time following each start time can be programmed to a small fraction of what would normally be used to bring the zone moisture content back to Field Capacity. Then when the timer starts a zone controlled by the Moisture-Activated Switch, a sensor reading will be made. If the soil moisture is less than the Refill Threshold, which in this embodiment is 90% of Field Capacity, the zone will run for the short programmed period. An hour later the zone will be turned on again and the Moisture-Activated Switch will take another moisture reading. If the soil is still less than 90% of field capacity it will be watered again. This will repeat until the soil moisture rises above the Refill Threshold. In subsequent cycles no water will be applied until the root zone moisture level drops below the Refill Threshold.

The initial automatic threshold setting feature is controlled by a non-volatile flag called "Programmed" in the memory of the microprocessor in the controller portion of the Moisture-Activated Switch. At the time of its production, the Moisture-Activated Switch is initialized with the Programmed flag cleared to the Off state. Each time power is applied to the unit the microprocessor initializes itself and tests the Programmed flag. If Programmed is in the Off state, the Moisture-Activated Switch executes the automatic threshold setting feature wherein it measures and stores Field Capacity and calculates and stores the Refill Threshold. It then sets the Programmed flag to the On state. During such a cycle in which the Programmed flag is set to On, no watering decision is made and the water is held off. When the irrigation controller subsequently applies power, the Moisture-Activated Switch wakes up and finds that the Programmed flag is set. It then measures the soil moisture, makes a decision regarding irrigation and executes that decision, calling for the application of water as appropriate.

Once the Programmed flag has been set it remains in the On state forever. In this state the Moisture-Activated Switch uses the Refill Threshold that was originally set as a reference for the watering threshold from that time forward. If the user wishes to change the setting, such as would be required if the Moisture-Activated Switch was to be moved to a different location, the Programmed flag can be cleared by connecting a current-limited dc-source to the terminals for 15 seconds. A common 9 volt battery provides such an acceptable source. This can be done through the field wiring from the irrigation controller terminal block or it can be done directly on an exhumed Moisture-Activated Switch.

While the Moisture-Activated Switch is awake and operating, it monitors the power at its terminals, checking for alternating current crossovers. If power is present but not alternating for 5 seconds the device enters a communications state. If no communications are detected after an additional 5 seconds, the Programmed flag is cleared and the internal switch is closed. This switch closure increases the current flow in the dc circuit. The increased current flow may be used to illuminate a LED or other device to provide feedback that the Programmed flag has been cleared.

Normally no other interaction with the Moisture-Activated Switch is required. However, the Moisture-Activated Switch also stores operational information that may be useful to the user desiring to adjust watering times or to review the performance of the zone irrigation. It may be desirable to modify the Moisture-Activated Switch threshold setting as will be discussed later. A review of the watering history of the device is useful to appreciate the incurred water savings.

Communications provisions are made for interrogating a buried Moisture-Activated Switch, to review Field Capacity and Refill Threshold settings, to make changes to those settings, and to review the operating history and performance of the device. A communications sequence is initiated by applying a dc voltage to the circuit in which the Moisture-Activated Switch is installed. A communications device containing a dc voltage source and a current limiting resistor, as well as serial communications circuitry is used for this purpose. When the Moisture-Activated Switch recognizes a 5-second sustained dc voltage across its two wires, it enters a serial communications mode. The communications-initiating device can then transmit commands by interrupting the dc voltage at a prescribed baud rate and communicate with the Moisture-Activated Switch asynchronously. After transmitting a command the communications device applies current-limited dc power to the Moisture-Activated Switch circuit and waits for a response.

The Moisture-Activated Switch responds by closing and opening its switch at the prescribed baud rate, thus creating an asynchronous fluctuation in voltage on the terminals of the communications-initiating device. In this manner the Moisture-Activated Switch responds to the commands from the communications-initiating device. One embodiment of a communications-initiating unit is a handheld device that is attached to the zone wiring at the controller terminal block, while the controller is turned off. Another embodiment of a communications-initiating unit is built into a specially-designed, automatic-programming controller to retrieve information useful for automatically setting zone run times and storing performance reports for the user.

If the communications-initiating device does not transmit a command within 10 seconds following its first application of dc power to the circuit, then the Moisture-Activated Switch clears its Programmed flag. This feature allows the Moisture-Activated Switch to be erased by simply connecting a 9-volt battery to its terminals or to the valve circuit in which it is installed for, say, 15 seconds. Thus, it is not required to use a communications unit to reset the device.

Figure 1:
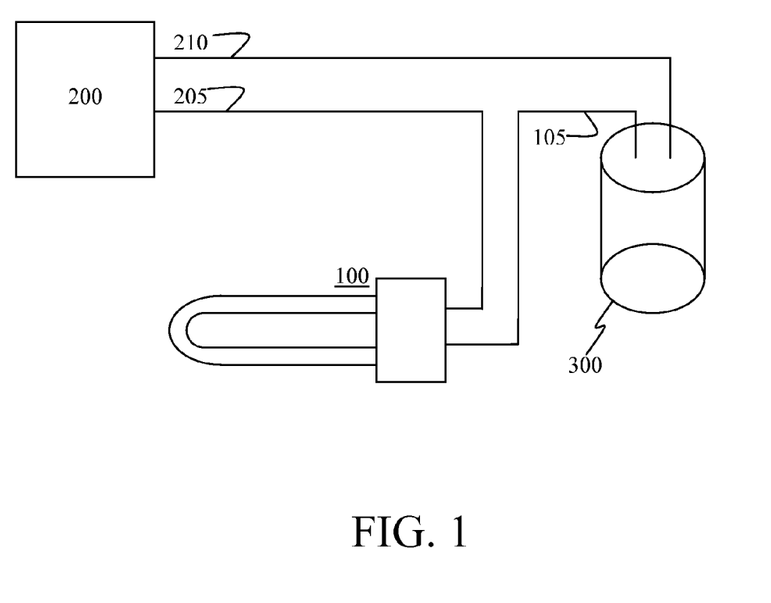
FIG. 1 is a simplified block diagram depicting the installation of the described apparatus for a single zone.

As shown in FIG. 1, two wires (105, 205) connect the Moisture-Activated Switch 100 controller/sensor unit in series with the zone wiring between the Irrigation Controller (Timer) 200 and the Solenoid Valve 300, while the zone control line 210 remains intact, connecting Irrigation Controller 200 to the Solenoid Valve 300. In fact, the Moisture-Activated Switch 100 can be installed in series with any 24 volt ac circuit that powers one or more solenoid valves or in series with a 24 volt ac relay used to control power to a pump or other electrical device. The load must draw current within a specified range, say, at least 50 mA but not more than 800 mA rms. Loads drawing in excess of the upper limit (800 mA rms in this example) will be automatically disconnected, that is, forced to an open circuit. The nominal load provided by a conventional solenoid valve is in the range of 180 to 250 mA.

Figure 2:
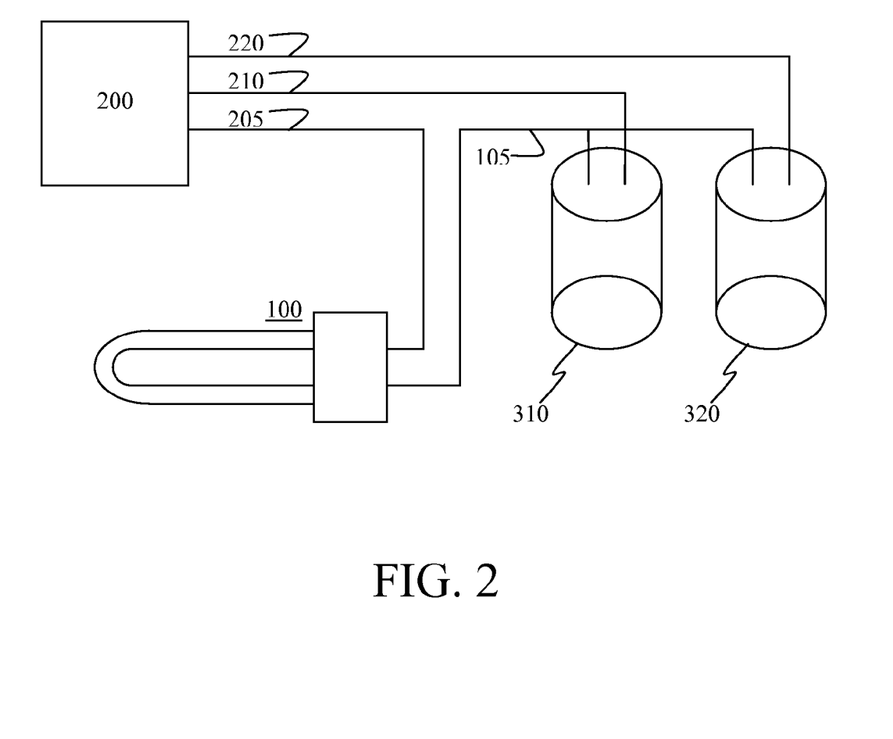
FIG. 2 is a simplified block diagram depicting the installation of the described apparatus for use across multiple zones.

If the Moisture-Activated Switch 100 is to control the watering of multiple zones, as depicted in FIG. 2, then the two wires (105, 205) from the Moisture-Activated Switch 100 must be connected in series with the common wire 105 leading to all of the solenoid valves (310, 320) that are to be controlled. It is important that the break in the common wire where the Moisture-Activated Switch 100 is to be inserted between the controller/timer 200 and the zone valves 310 and 320. To be properly effective, the sensor must be installed within one of the controlled zones. The timer must be set to water the zones such that there is no idle period in excess of 30 minutes during the group watering time.

In one embodiment, the microprocessor of the Moisture-Activated Switch is required to maintain a timer for at least 30 minutes after power has been removed from the zone circuit. At the end of the 30 minute period enough energy must be left to write to a flash memory and to change the state of a flag to show that a watering cycle has ended properly. If power is restored before 30 minutes has elapsed, the state at that instant is preserved and the power-down timer is reset to time the next end of cycle.

The current for this operation is stored in a 0.1 F, 5.5 volt double-layer capacitor. A capacitor of that size provides 150 mA-seconds of charge over a 1.5 volt discharge. At a current flow of 50 uA the charge consumed in 30 minutes amounts to 90 mA-seconds which leaves 60 mA-seconds remaining to write to a flash memory device.

Short-term energy storage is provided by a standard electrolytic capacitor that is charged from a rectifier across the two input terminals of the Moisture-Activated Switch unit. When the unit is operating in its full power mode it uses energy from this supply.

When the timer applies power to the zone or zones to which the Moisture-Activated Switch is connected, the switch in the control module of the Moisture-Activated Switch will be in the open state and the solenoid valve will not turn on. However, a small ac leakage current will flow through the series circuit consisting of the solenoid valve and the high impedance Moisture-Activated Switch module. That current is used to charge the internal short-term energy storage device and to wake up the Moisture-Activated Switch. When it is so awakened the Moisture-Activated Switch performs in accordance with the setting of the "Programmed" flag, depending upon whether or not a dc voltage is being applied to it. As long as the switch is open the Moisture-Activated Switch will continue to receive power from the voltage present at its terminals and the small leakage current passing through it. However, when the switch is closed the voltage across its terminals drops to where the device can no longer receive power. The short-term energy storage capacitor can supply the Moisture-Activated Switch in its full power mode for periods on the order of 100 ms. The capacitor voltage is monitored such that when it falls to approximately 12 volts the switch is opened momentarily to allow the storage capacitor to re-charge to the 24 volt range. The recharge time is on the order of a few milliseconds. Thus, the solenoid valve is relatively unaffected by the short absence of power.

Figure 3:
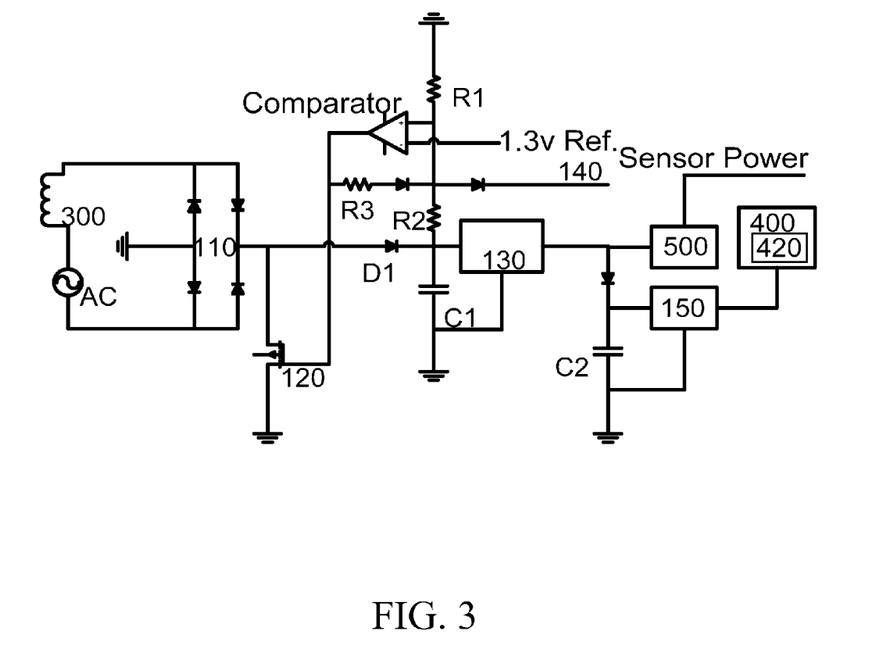
FIG. 3 shows a simplified schematic of power control circuitry for use within the present invention.

FIG. 3 shows the valve switch and power supply configuration for the Moisture-Activated Switch. The valve switch is comprised of a bridge rectifier 110 and a MOSFET 120. When the MOSFET 120 is turned on, it shorts the output of the bridge rectifier 110, thus providing an ac switch for the solenoid valve 300. In its Off state, the MOSFET 120 allows the output of the bridge rectifier 110 to charge capacitor C1 through an isolation diode D1. The main power for the Moisture-Activated Switch 100 is derived from C1 and regulated by the switching regulator 130. The output of the switching regulator 130 also charges the double-layer capacitor C2. This capacitor stores the long-term charge necessary to keep the microprocessor and a timer running for at least 30 minutes after power is discontinued.

When the MOSFET switch (120) is closed, capacitor C1 discharges down to a threshold level set by the voltage divider resistors (R1 and R2) and the hysteresis resistor R3. When that threshold is reached, the switch 120 is momentarily opened and C1 is recharged up to the value set by the voltage divider (R1, R2). In this manner a low duty cycle recharging mechanism is maintained that keeps the microprocessor of the Moisture-Activated Switch running when the ac switch 120 is closed.

The only time the valve switch is closed is when the timer power is on and the Moisture-Activated Switch 100 has determined that the zone needs to be watered. It is only in this condition that the power supply recharge logic needs to monitor capacitor C1 and switch the valve circuit off and on for recharging. A low output at the Valve On input 140 from the microprocessor holds the power supply recharge logic in a constant capacitor charging state unless water is to be applied.

A voltage regulator 500 provides 3.3 volts dc for the sensor electronics. The switching regulator 130 provides 5.5 volts for the double-layer capacitor (C2) charging circuit. A 3.3 volt Low Dropout Regulator (LDO) 150 powered from the double-layer capacitor C2 provides power to the microprocessor 400. Thus, when the power is turned off the microprocessor 400 continues to run from the double layer capacitor C2 until it discharges. The Timer in the microprocessor 400 thus continues to run for at least 30 minutes after the power is shut off. The microprocessor LDO 150 has a "Power Good" output which resets the microprocessor 400 when the voltage on the double-layer capacitor C2 becomes depleted. The microprocessor 400 also monitors the main sensor power supply 500. This allows the microprocessor 400 to shut down everything except the real-time clock 420 when power is lost in order to conserve the power stored on the double-layer capacitor C2.

The switch closure is accomplished through a bridge rectifier 110 and a power MOSFET 120. The two wires (105, 205) coming into the Moisture-Activated Switch 100 connect to the ac inputs of the bridge rectifier 110. The negative output is connected to the circuit common, or ground, and the positive output is connected to ground through a power MOSFET 120. Thus, when the MOSFET 120 is in its On state, the output of the bridge rectifier 110 is short-circuited causing the two input wires (105, 205) to be shorted together by two diode drops in each ac direction through the bridge rectifier 110. A current sense resistor in series with the MOSFET (not shown in FIG. 3) monitors the short circuit current. If that current exceeds about 850 mA rms, the microprocessor opens the switch.

At least one embodiment of the Moisture-Activated Switch works in concert with a hand-held communications module, though the communications module is not required to operate the Moisture-Activated Switch. The communications module is an accessory that may be used to gather data regarding soil properties, to change the mode of operation, or to reset operating parameters of the Moisture-Activated Switch. One embodiment of the communications module is powered by a common 9 volt alkaline battery. The same battery also supplies power to the Moisture-Activated Switch module when it is in communication with the hand-held unit.

Figure 4:
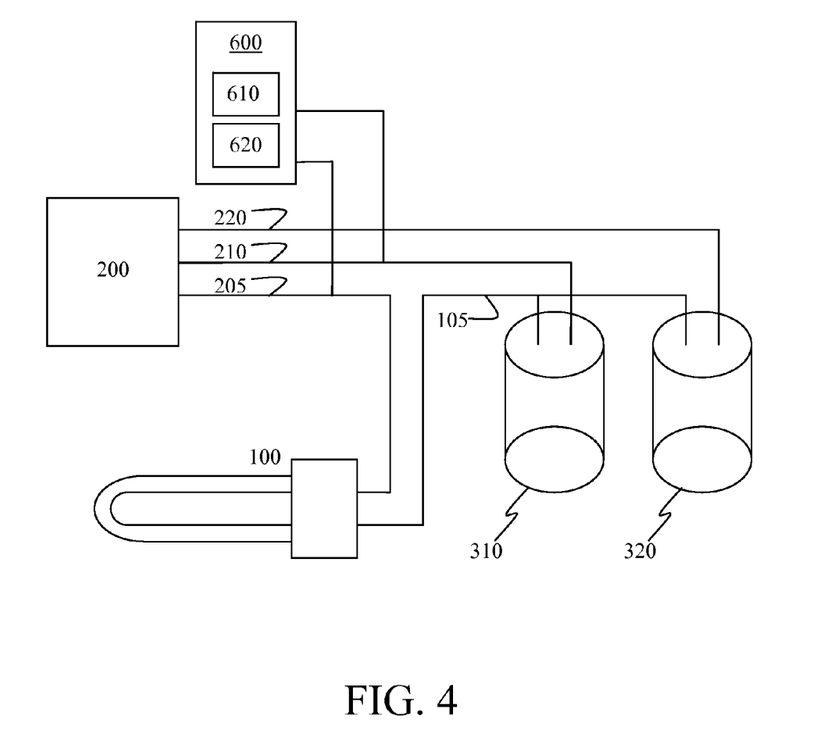
FIG. 4 is a simplified block diagram of the described apparatus in a test or maintenance configuration.

Before attempting to communicate with an installed Moisture-Activated Switch, the irrigation controller should be turned off or disconnected in order to avoid conflicts. One of the two connections from the communications module 600, shown in FIG. 4, is connected to the Common terminal of the irrigation timer. The other of the two connections from the communications module is then connected to the selected Moisture-Activated Switch, generally through the zone wire at the centrally located terminal block of the irrigation timer. After 5 seconds the communication unit will indicate that it is Connected. This indication may be given by any of several means, such as an icon on an LCD display, or by an LED. The communications module will then transmit an Acknowledge signal back to the Moisture-Activated Switch. The Acknowledge signal will inhibit the Moisture-Activated Switch from erasing its settings after a 10 second connection timer times out.

Another embodiment of the communications module has a display and keypad.

A MENU key is used to select a function, and then depression of an EXECUTE key causes the selected function to be performed.

Available MENU selections are:
Read Soil Moisture;
Read Soil Temperature;
Read Soil Electrical Conductivity;
Read Recommended Watering Inches;
Read Soil Field Capacity;
Read Soil Refill Threshold;
Read Last 10 Watering Decisions;
Read 30 Day Watering Duty Cycle;
Increment Soil Refill Threshold;
Decrement Soil Refill Threshold; and
Reset Programmed flag.

The Recommended Watering Inches can be used to calculate the run time for the zone using the following equation.

$$T_{rm} = \frac{60 W_{in}}{R_{pe}} \qquad \text{[Equation 1]}$$

In this equation, Trm is the run time in minutes for which the timer for this zone should be programmed.

Win is the Amount of Water in inches that the Moisture-Activated Switch recommends for the zone. Note that Win will only be valid following completion of an Auto Set operation. The amount of water needed by the zone is calculated by the Moisture-Activated Switch from the Field Capacity of the zone as measured during an Auto Set operation.

The equation used by the Moisture-Activated Switch is:

$$W_{in}=(1-TH)FC\delta \qquad \text{[Equation 2], where}$$

TH is the threshold setting.

FC is the Field Capacity measured by the Moisture-Activated Switch and

δ is the desired depth of water penetration, typically set at 7 inches.

Rpe is the effective precipitation rate of a sprinkler head as set up for the particular zone of interest. Rpe has dimension of inches per hour. One method of determining this number is to place four catch basins, such as cups, at various locations within the zone and then watering that zone for 15 minutes. After the watering period, the water from the four basins is collected into one of them and the total number of inches for the set of collectors is recorded as the precipitation rate in inches per hour. Rather than measuring the actual precipitation rate, the following values may be assumed for well designed zones for a selection of sprinkler types:

Matched Precipitation rotors at 0.4 inches per hour;
Rotors and Impact Sprinklers at 0.7 inches per hour; and
Pop-up Spray Heads at 1.4 inches per hour.

As an example of the system in operation, assume that the "Amount of Water" given by the Moisture-Activated Switch after an Auto Set operation is 0.63 inches. Also, assume that the total water collected by four cups after 15 minutes of watering is 0.8 inches, indicating an application rate of 0.8 inches per hour within the zone of interest.

Working with Equation 1, multiply 0.63 by 60 and divide the result by 0.8 to yield a calculated run time for the zone of 47.25 minutes. Setting the run time for the zone to 47 minutes will then apply sufficient water to bring the soil moisture from the Refill Threshold back up to Field Capacity to a depth of 7 inches.

Each time the timer attempts to water the zone the Moisture-Activated Switch will either block or allow that watering based on soil moisture conditions. The result of each decision is saved in a non-volatile buffer with, say, 30 entries. All of the decisions to water or not to water are summed and then divided by the total number of watering cycles attempted by the timer. For example, if eight watering events were allowed out of the last 30 attempts by the timer the run ratio would be 26.7% (which is 8 divided by 30).

The run ratio number provides an indication of the effectiveness of the Moisture-Activated Switch system as the irrigation season progresses. The irrigation season will start with a low value for the effectiveness ratio in the spring, increase during the hot summer months when more water is required, and finally will decrease in the fall as the weather cools. During periods where rainfall occurs, the run ratio will naturally drop as there will be less need for supplemental irrigation.

A Watering History indicator is associated with the Run Ratio memory. A portion of the display on the communications module contains one indicator for each of the ten previous watering cycles as initiated by the timer. The indicators show whether or not the Moisture-Activated Switch watered during the corresponding timer cycle. With the right-most indicator representing the most recent watering attempt, each new attempt causes the information to be shifted to the left. This field of the display provides a visual indication of when the timer actually caused water to be applied over the past ten watering cycles. It also serves as an indication of the effectiveness of the Moisture-Activated Switch system.

Field Capacity is a property of the soil in the root zone below the surface area that is being irrigated. A Field Capacity reading represents the maximum amount of water that the soil can hold before water begins to leech out of the root zone and into the subsoil and groundwater where it is wasted. Field Capacity can be easily measured by saturating the soil around the sensor and then allowing the soil to drain for several hours in the absence of evaporation and transpiration, such as overnight. A reading taken in the early morning, following a soaking the previous evening, indicates the Field Capacity of the soil. This can be automatically set by the Moisture-Activated Switch but provision is made for a manual override subject to a caution to avoid stressing the lawn or other irrigated crop due to too little water, or wasting water by overwatering. The Field Capacity can be read in the display after using the MENU button to select the Off Threshold.

To read the Watering Threshold setting, the MENU button is operated to select the Refill Threshold. The display will then indicate the threshold setting that the Moisture-Activated Switch is currently using to determine whether or not water will be applied when the zone is enabled by the timer. The setting may be modified by selecting the MENU option to either Increment Refill Threshold or Decrement Refill Threshold and then operating the EXECUTE button. The Refill Threshold will increase or decrease in increments of 0.5% for each press of the EXECUTE button.

The Moisture-Activated Switch sets the Watering Threshold automatically upon the first watering attempt after installation. The Watering Threshold is calculated from Field Capacity as 78% of Field Capacity in one embodiment. In another it is set at 90 to 95% of Field Capacity as explained earlier. Adjustments to the automatic setting can be made through this MENU item.

Though described here primarily as a control for the irrigation of grass crops, such as lawn, it will be recognized by one skilled in the appropriate arts that the described techniques and apparatus may be applied more generally to other crops.

Furthermore, although the techniques and apparatus described here are used to apply water to increase the moisture content of a medium such as soil in the root zone of an irrigated crop, other more general moisture-compensation uses will be apparent. With limited modification the described system may be readily adapted to other media for the maintenance of moisture content in a controlled manner.

While the present invention has been described with respect to one or more preferred embodiments, there is no implication to restrict the present invention to preclude other implementations that will be apparent to those skilled in the related arts. It is easily recognized that the described invention may be implemented with a variety of components, operating over a wide range of conditions, and in various topologies adapted to a multitude of applications. Therefore, it is not intended that the invention be limited to the disclosed embodiments or to the specifically described details insofar as variations can be made within the spirit and scope of the appended claims.

What is claimed is:

1. A moisture-activated switch, comprising:
   an absolute moisture sensor;
   a controller circuit for controlling actuation of a moisture-compensating device,
   a waterproof enclosure; and
   a two-conductor connection,
   wherein the absolute moisture sensor and the controller circuit are integrated into a single device within the waterproof enclosure for placement within a medium for which moisture is to be controlled,
   the absolute moisture sensor is coupled to the controller circuit and provides to the controller circuit a signal corresponding to an absolute moisture level of said medium, and
   the moisture-activated switch actuates the moisture-compensating device through the two-conductor connection,
   wherein a first conductor of the two-conductor connection is a supply line, and
   a second conductor of the two-conductor connection is a return line.

2. The moisture-activated switch of claim 1, wherein the first conductor serves as both a voltage supply line and a communication line, and
   the second conductor provides a return path for the first conductor in both of its modes as the voltage supply line and as the communication line.

3. The moisture-activated switch of claim 2, wherein communications transmitted over the communication line include control signals and data signals.

4. The moisture-activated switch of claim 1, wherein the controller circuit automatically programs itself in response to a first application of power from an external source.

5. The moisture-activated switch of claim 4, wherein the controller circuit is resettable to allow it to automatically reprogram itself.

6. The moisture-activated switch of claim 1, wherein the moisture-compensating device is a valve, the actuation of which applies moisture to said medium.

7. The moisture-activated switch of claim 6, wherein said medium is soil, and the valve serves for the application of irrigation water.

* * * * *